US010733599B2

(12) United States Patent
Ghosh et al.

(10) Patent No.: US 10,733,599 B2
(45) Date of Patent: Aug. 4, 2020

(54) ACCESSING DIGITAL WALLET INFORMATION USING A POINT-OF-SALE DEVICE

(71) Applicant: PAYPAL, INC., San Jose, CA (US)

(72) Inventors: Abhishek Ghosh, San Jose, CA (US); Jan Rosen, Mountain View, CA (US); Bharat Savani, Milpitas, CA (US); Abhishikth Nandam, Union City, CA (US); Surojit Bhaduri, Dublin, CA (US)

(73) Assignee: PayPal, Inc., San Jose, CA (US)

( * ) Notice: Subject to any disclaimer, the term of this patent is extended or adjusted under 35 U.S.C. 154(b) by 375 days.

(21) Appl. No.: 15/610,316

(22) Filed: May 31, 2017

(65) Prior Publication Data

US 2018/0349889 A1    Dec. 6, 2018

(51) Int. Cl.
*G06Q 20/36* (2012.01)
*G06Q 20/20* (2012.01)

(52) U.S. Cl.
CPC ....... *G06Q 20/3674* (2013.01); *G06Q 20/202* (2013.01); *G06Q 20/204* (2013.01)

(58) Field of Classification Search
CPC ............ G06Q 20/3674; G06Q 20/202; G06Q 20/204; G06Q 20/387; G06Q 30/0226
See application file for complete search history.

(56) References Cited

U.S. PATENT DOCUMENTS

| 6,888,837 B1 | 5/2005 | Cunningham et al. |
| 8,768,834 B2* | 7/2014 | Zacarias ............... G06Q 20/36 705/41 |
| 9,055,117 B1 | 6/2015 | Dickinson et al. |
| 2001/0037312 A1* | 11/2001 | Gray .................. G06Q 20/00 705/67 |
| 2004/0073704 A1 | 4/2004 | Paunikar et al. |
| 2008/0147546 A1* | 6/2008 | Weichselbaumer ........ G06Q 20/105 705/41 |
| 2011/0264558 A1* | 10/2011 | Alexandrou ........ G06Q 20/02 705/26.41 |

(Continued)

FOREIGN PATENT DOCUMENTS

JP    2012053686 A  *  3/2012

*Primary Examiner* — Florian M Zeender
*Assistant Examiner* — Vanessa Deligi
(74) *Attorney, Agent, or Firm* — Haynes and Boone, LLP

(57) ABSTRACT

A system is configured to perform operations that include receiving an input corresponding to a transaction by a user at a merchant location and determining, based on the input, an identifier corresponding to the user. The operations also include authenticating, via an electronic network, the user with a payment provider server of a payment provider and accessing from the payment provider server based on the identifier, digital wallet information corresponding an account of the user that is maintained by the payment provider. The operations further include receiving a selection of a first digital payment instrument of one or more digital payment instruments and transmitting, via a payment network to a payment processor, payment instructions that cause the payment processor to process a payment corresponding to the transaction using first payment information associated with the first digital payment instrument.

20 Claims, 5 Drawing Sheets

(56) References Cited

U.S. PATENT DOCUMENTS

| | | | |
|---|---|---|---|
| 2014/0032399 A1* | 1/2014 | Gonthier | G06Q 20/10 |
| | | | 705/39 |
| 2014/0058865 A1* | 2/2014 | Yang | G06Q 20/327 |
| | | | 705/21 |
| 2014/0058938 A1* | 2/2014 | McClung, III | G06Q 20/227 |
| | | | 705/41 |
| 2015/0095129 A1* | 4/2015 | Daigle | G06Q 30/0231 |
| | | | 705/14.27 |
| 2015/0096004 A1* | 4/2015 | Zhou | H04L 63/1441 |
| | | | 726/7 |
| 2015/0356551 A1* | 12/2015 | Dogin | G06Q 20/3572 |
| | | | 705/17 |
| 2015/0371207 A1* | 12/2015 | Cummins | G06Q 20/4016 |
| | | | 705/39 |
| 2016/0072764 A1 | 3/2016 | Arshinov | |
| 2016/0189150 A1* | 6/2016 | Ahuja | G06Q 20/4016 |
| | | | 705/44 |
| 2016/0232518 A1* | 8/2016 | Butler, IV | G06Q 20/367 |
| 2017/0006008 A1* | 1/2017 | Moran | H04L 63/08 |
| 2017/0048230 A1* | 2/2017 | Johansson | H04L 63/0861 |
| 2017/0132635 A1* | 5/2017 | Caldera | G06Q 20/4016 |

\* cited by examiner

ACCESSING DIGITAL WALLET INFORMATION USING A POINT-OF-SALE DEVICE

BACKGROUND

Digital wallets that store different payment instruments for a user have recently become more popular. Currently, a customer may use a personal electronic device, such as a mobile phone, to access digital wallet information to participate in a digital payment transaction. As such, customers that do not carry personal electronic devices are unable to access their digital wallet information.

Figure 1:
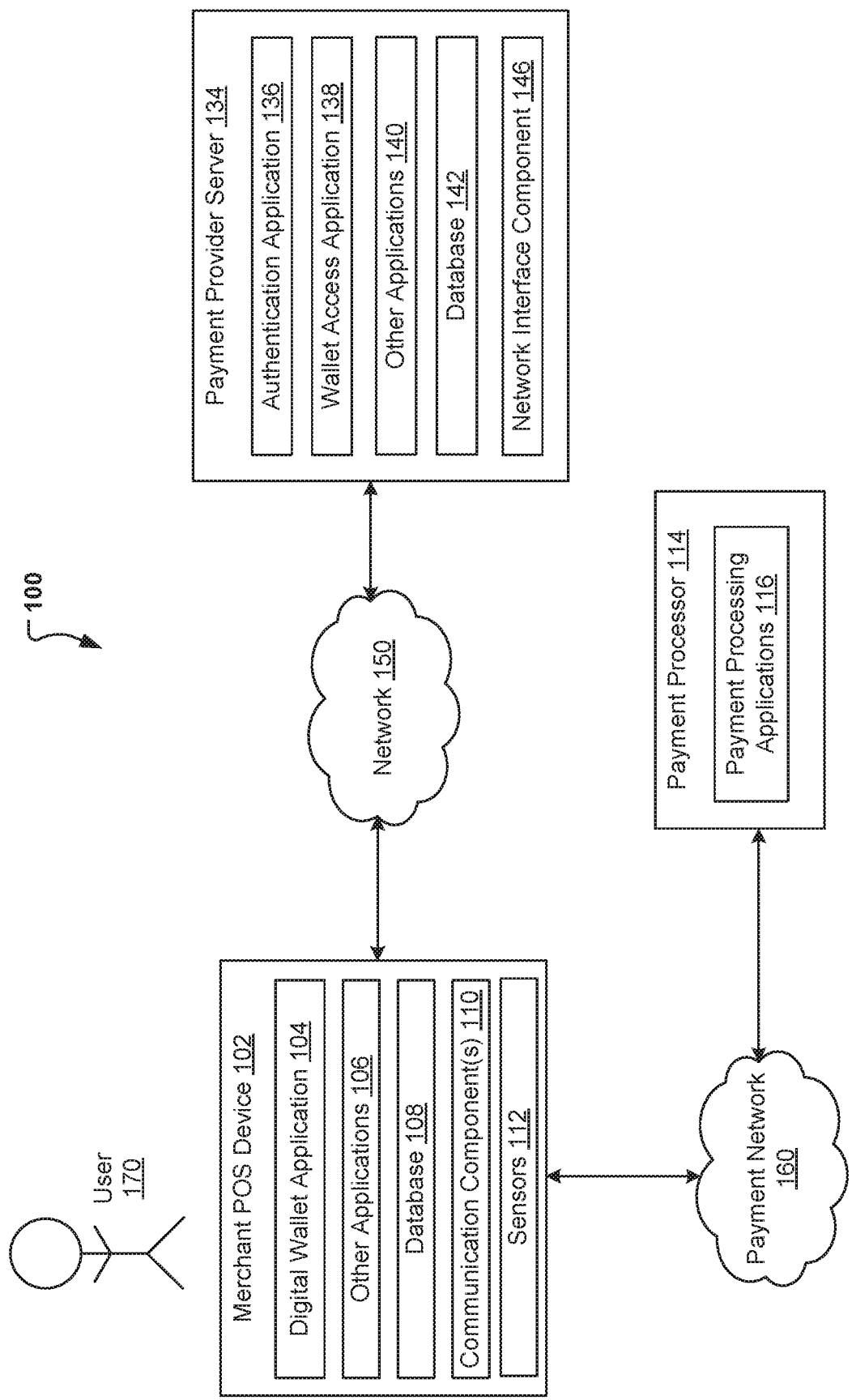
FIG. 1 is a block diagram of a networked system suitable for implementing the processes described herein for accessing digital wallet information using a point-of-sale device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for accessing digital wallet information using a point-of-sale (POS) device. A system may include a merchant POS device, a payment provider server associated with a payment provider, and a payment processor. The merchant POS device may communicate with the payment provider server via an electronic network. The merchant POS device may communicate with the payment processor via a payment network. In some cases, the payment network may be different from the electronic network. For instance, the electronic network may correspond to the Internet, and the payment network may correspond to a network than enables payments and/or financial information to be processed, such as a card payment network, an Automatic Clearing House network, an electronic funds transfer network, and/or the like. However, in other embodiments, the merchant POS device, the payment provider server, and the payment processor may communicate with each other over the same network.

According to certain embodiments, the merchant POS device may be associated with a particular merchant at a merchant location, such as a store of the merchant. The merchant POS device may be physically located at the merchant location to facilitate payment transactions for customers wishing to purchase goods or service sold by the merchant. Further, the merchant POS device may be associated with a POS identifier. The POS identifier may be stored in a database, which may store an association between the POS identifier, a merchant identifier corresponding to the merchant, and/or the merchant location. In certain embodiments, the database may be accessible by the payment provider server to determine the type of digital wallet information to provide to the merchant POS device, as described further below.

A user, such as a customer of the merchant may be shopping at the merchant location and may wish to buy a particular product or service sold by the merchant. The user may therefore conduct a transaction with the merchant using the merchant POS device. As such, the merchant POS device may receive a selection to access a digital wallet corresponding to the user to conduct the transaction between the user and the merchant. For example, the merchant POS device may include a display that presents various options corresponding to different payment methods for conducting a payment transaction with the merchant. The various options may include a credit card payment option, a debit card payment option, a gift card payment option, a loyalty card payment option, and/or other types of payment options. In some embodiments, the display may be activated upon detecting that the user is within a predetermined distance from the merchant POS device. For example, the merchant POS device may include a camera, infrared sensor, and/or any other type of proximity sensor to detect the presence of the user.

In certain embodiments, the merchant POS device may also display a digital wallet payment option that enables access to a digital wallet, such as a digital wallet provided by the payment provider. According to a particular embodiment, the user may select the digital wallet payment option to conduct the transaction with the merchant. Further, in certain implementations, the display included in the merchant POS device may be configured to receive touch input, and the user may touch a portion of the display that corresponds to a selection of the digital wallet payment option.

The user may also provide another input to the merchant POS device, and based on the input, the merchant POS device may determine a user identifier of the user that is associated with an account maintained by the payment provider. For example, the input may correspond to a user inserting or swiping a particular card in the merchant POS device. In this scenario, the card may be associated with the payment provider and may store the user identifier, such on a magnetic stripe or a chip included in the card. Thus, the merchant POS device may be able to access the information stored on the magnetic stripe or chip of the card, including the user identifier. In certain cases, the insertion or swipe of the particular card in the merchant POS device may also indicate a selection by the user to access the digital wallet payment option. As a result, both the selection to access the digital wallet payment option and the user identifier may be provided to the merchant POS device base on the insertion or swipe of the particular card.

As another example, the user may provide the user identifier to the merchant POS device by manually inputting information on the merchant POS device. For instance, as previously discussed, the merchant POS device may include a display capable of receiving touch input, and/or in some instances, may also include a keypad. After receiving a selection of the digital wallet payment option from the user, the merchant POS device may display a request for authentication credentials, such as login information (e.g., username/password). The user may input login information to the merchant POS device, and the merchant POS device may forward the login information to the payment provider server. The payment provider server may determine whether the login information matches any stored login information, and if a match is detected, the payment provider server may determine the user identifier associated with the login information.

In another example, the user may wirelessly provide the user identifier using a mobile device corresponding to the user. For instance, the mobile device may include a wireless communication transceiver that transmits the user identifier in response to the mobile device being within a predetermined distance of the merchant POS device.

According to one or more embodiments, the user may also be authenticated with the payment provider before being provided access to the digital wallet information. Various authentication methods are possible with respect to authenticating the user with the payment provider. For instance, the user may be authenticated via biometric information, username/password information, personal identification numbers (PINs), facial recognition, voice recognition, security questions, and/or the like. For instance, the merchant POS device may request authentication credentials after the user inserts or swipes the particular card in the merchant POS device. In other examples, authentication credentials are provided to the merchant POS device when the user inputs the username/password combination discussed above. The merchant POS device may transmit (e.g., forward) the authentication credentials to the payment provider server, and the payment provider server may authenticate the user (or determine that the user cannot be authenticated) based on the authentication credentials.

In certain implementations, the type of authentication credentials and/or the number of authentication credentials requested to authenticate the user may be based on a trustworthiness score corresponding to transaction. The trustworthiness score may be determined by the payment provider server based on a shopping history of the user, a reputation of the merchant or the merchant location, location information corresponding to the user, and/or various other factors. For instance, if the payment provider server determines that a low trustworthiness score corresponds to a particular transaction, the payment provider server may request (e.g., via the merchant POS device), from the user, authentication credentials that include username/password information, biometric information, PINs, and answers to one or more security questions. As another example, if the payment provider server determines that another transaction corresponds to a relatively high trustworthiness score, the payment provider server may request (e.g., via the merchant POS device), from the user, authentication credentials that include only a PIN. It will be appreciated that various other combinations of trustworthiness scores, types of authentication credentials, and number of authentication credentials are possible and are contemplated within the present disclosure.

Subsequent to authenticating the user with the payment provider server, the merchant POS device may present, via the display, one or more digital payment instruments included in the digital wallet account. Digital payment instruments may correspond to various payment instruments including, but not limited to, credit cards, debit cards, coupons, store cards, gift cards, loyalty cards and/or loyalty accounts, bank accounts, electronic checks, merchant offers, and/or any accounts maintained by financial institutions. According to a particular embodiment, the merchant POS device may display the digital payment instruments based on the merchant or merchant location. For instance, the digital wallet information may indicate that digital wallet account of the user includes a credit card, a loyalty card associated with the merchant, and a gift card associated with a different merchant. The merchant POS device may determine, based on the gift card's association with the different merchant, that the gift card is unusable for the transaction. As a result, the merchant POS device may not display the gift card or may otherwise indicate that use of the gift card is unavailable for the transaction.

The merchant POS device may also receive a selection of a first digital payment instrument from the one or more digital payment instruments presented on the display. Subsequent to receiving the selection of the first digital payment instrument, the merchant POS device may transmit instructions to the payment processor to process the transaction using payment information associated with the first digital payment instrument.

Thus, a user who is located at the merchant location (e.g., a store of the merchant) may be able to access the digital wallet information, using the merchant POS device, to complete a transaction to purchase a product or service sold by the merchant. As a result, the user need not carry a mobile device of his/her own in order to access the digital wallet information. If the user does carry a mobile device, the mobile device need not store the digital wallet information. Further, the need to carry a physical wallet may be reduced or eliminated. Similarly, the need to carry physical payment instruments may be reduced or eliminated since the digital wallet information can be accessed using the merchant POS device.

In addition, merchant POS devices that enable access to digital wallet information as described above may drive more business to merchants to utilize the merchant POS devices. For example, the convenience provided to potential customers of being able to access their digital wallet information without having to bring a mobile device of their own may entice customers to shop with the merchant.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a merchant POS device 102 configured to interface with a user 170, a payment processor 114, and a payment provider server 134. The merchant POS device 102 may communicate with the payment provider server 134 over a network 150. The merchant POS device 102 may communicate with the payment processor 114 over a payment network 160. The merchant POS device 102, the payment processor 114, and the payment provider server 134 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The merchant POS device 102 may be implemented as a communication device that may utilize appropriate hardware and software configured for wired and/or wireless communication with the payment processor 114 and/or payment provider server 134. The merchant POS device 102 may be located at a physical location of a merchant (e.g., a merchant location) and may be configured to facilitate payment for products or services sold by the merchant at the merchant location. For instance, the merchant POS device 102 may be configured to accept various forms of payment, including, but not limited to credit card payments, debit card payments, loyalty card payments, gift card payments, store card payments, and/or payment made by accessing a digital wallet.

The merchant POS device 102 may correspond to and be utilized by a user 170. According to certain embodiments, the user 170 may be a customer of the merchant at the merchant location. The user 170 may wish to purchase a product or service sold by the merchant at the merchant location. As such, the user 170 may interact with the merchant POS device 102 to participate in a transaction with the merchant to purchase the product or service. Furthermore, although only one merchant POS device 102 is shown, a plurality of merchant POS devices may function similarly.

The merchant POS device 102 may include a digital wallet application 104, other applications 106, a database 108, communication components 110, and sensors 112. The digital wallet application 104 and other applications 106 may correspond to executable processes, procedures, and/or applications with associated hardware. In other embodiments, merchant POS device 102 may include additional or different components having specialized hardware and/or software to perform operations associated with the digital wallet applications 104 and/or the other applications 106.

The digital wallet application 104 may be provided and maintained by a payment provider associated with the payment provider server 134. In certain embodiments, the digital wallet application 104 may facilitate financial transactions, such as payment transactions between users and/or payment transactions corresponding to a sale of goods or services provided by the merchant to a user 170. For example, the digital wallet application 104 may provide an interface to enable remittance between the user 170 of the merchant POS device 102 and the merchant. In particular, the digital wallet application 104 may communicate with a payment processor 114 (e.g., such as a payment processing application executed by the payment provider server 134). The payment processor 114 may transfer a payment amount between a first account associated with the user 170 and a second account associated with the merchant. The digital wallet application 104 may also facilitate other types of financial transactions associated with banking, online payments, money transfers, and/or the like. Further, as described in more detail below, the digital wallet application 104 may enable the user 170 to access a digital wallet account maintained by a payment provider of the payment provider server 134.

The merchant POS device 102 may execute the other applications 106 to perform various other tasks and/or operations corresponding to the merchant POS device 102. For example, the other applications 106 may include security applications for implementing client-side security features, programmatic client applications for interfacing with appropriate application programming interfaces (APIs) over network 150 and/or payment network 160, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the merchant POS device 102. The other applications may 106 include social networking applications. Additionally, the other applications 106 may include device interfaces and other display modules that may receive input and/or output information. For example, the other applications 106 may include a graphical (GUI) configured to provide an interface to the user.

The merchant POS device 102 may further include a database 108, which may be stored in a memory and/or other storage device of the merchant POS device 102. The database 108 may include, for example, identifiers (IDs) such as operating system registry entries, cookies associated with the digital wallet application 104 and/or other applications 106, IDs associated with hardware of the communication component 110, IDs used for payment/user/device authentication or identification, and/or other appropriate IDs. According to a particular embodiment, the database 108 may also store a merchant identifier associated with the merchant, a location identifier associated with the merchant location, and/or a POS identifier associated with the merchant POS device 102. The database 108 may also include information corresponding to one or purchase transactions of customers who have purchased goods or services from the merchant, browsing histories of the customers, or other types of customer information. In certain embodiments, the merchant POS device 102 may also include information corresponding to payment tokens, such as payment tokens generated by the payment provider server 134. Further, the database 108 may store login credentials, contact information, biometric information, and/or authentication information.

The merchant POS device 102 may also include at least one communication component 110 configured to communicate with various other devices such as the payment processor 114 and/or the payment provider server 134. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The merchant POS device 102 may also include one or more hardware sensors 112 to determine user inputs from the user 170, motion of the merchant POS device 102, biometric information associated with the user 170, and/or various environmental data associated with the merchant POS device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The payment provider server 134 may be maintained, for example, by the payment provider, which may provide payment processing services for the merchant. In one example, the payment provider server 134 may be provided by PAYPAL, Inc. of San Jose, Calif., USA. However, in other embodiments, the payment provider server 134 may be maintained by or include a financial service provider, social networking service, email or messaging service, media sharing service, and/or other service provider, which may provide payment processing services.

The payment provider server 134 includes an authentication application 136 that is configured to authenticate the user 170 (or other users of the merchant POS device 102) with the payment provider server based on authentication credentials received from the merchant POS device 102 via the network 150. The authentication may be performed in response to a request, from the merchant POS device 102, to access digital wallet information associated with an account (e.g., an account of the user 170) maintained by the payment provider. As described in further detail below, the authentication application 136 may determine how to authenticate the user 170 based on a trustworthiness score corresponding to the transaction between the user 170 and the merchant.

The payment provider server 134 may also include a wallet access application 138, which may be executed by the payment provider server 134 to determine digital wallet information to provide to the merchant POS device 102. For instance, the digital wallet application 138 may access digital wallet information corresponding to an account of the user 170 maintained by the payment provider. The digital wallet information may indicate one or more digital payment instruments that are associated with the account. Digital payment instruments may include, but are not limited to digital representations of credit cards, debit cards, loyalty cards, gift cards, store cards, bank accounts, other financial accounts, coupons, and offers. As such, a user (e.g., user 170) may access the account to use one or more of the digital payment instruments to pay for good and/or service sold by the merchant at the merchant location. It will be appreciated that the user 170 may also access the digital wallet information associated with the account to make purchases in other contexts as well, such as online purchases with other merchants, or other merchant at different locations. Furthermore, as described in more detail below, the wallet access application 138 may also determine the type of digital wallet information to provide to merchant POS device 102 based on various characteristics of payment instruments included in the digital wallet and/or characteristics of the merchant, merchant location, and/or merchant POS device 102.

The payment provider server 134 may execute the other applications 140 to perform various other tasks and/or operations corresponding to the payment provider server and/or the merchant POS device 102. For example, the other applications 140 may include security applications for implementing server-side security features, programmatic client applications for interfacing with appropriate application programming interfaces (APIs) over network 150, or other types of applications. The other applications 140 may also include additional communication applications, such as email, texting, voice, and instant messaging (IM) applications that enable a user to send and receive emails, calls, texts, and other notifications through the network 150. In various embodiments, the other applications 140 may include location detection applications, such as a mapping, compass, and/or global positioning system (GPS) applications, which may be used to determine a location of the merchant POS device 102. The other applications may 140 include social networking applications. Additionally, the other applications 140 may include device interfaces and other display modules that may receive input and/or output information. For example, the other applications 140 may include a GUI configured to provide an interface to the user.

The payment provider server 134 may further include a database 142, which may be stored in a memory and/or other storage device of the payment provider server 134. The database 142 may include, for example, IDs such as operating system registry entries, cookies associated with the payment processing application 136, biometric information, IDs associated with hardware of the network interface component 146, IDs used for payment/user/device authentication or identification, and/or other appropriate IDs. According to a particular embodiment, the database 108 may also store a merchant identifier associated with the merchant, a location identifier associated with the merchant location, and/or a POS identifier associated with the merchant POS device 102.

In various embodiments, the payment provider server 134 also includes at least one network interface component 146 that is configured to communicate with the merchant POS device 102 and/or the payment processor 114 via the network 150 and/or the payment network 160. For example, according to a particular embodiment, the payment provider server 134 may receive voice communication information from the merchant POS device 102 via the network interface component 146. The network interface component 146 may comprise a DSL modem, a PSTN modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

The payment network 160 may be implemented as a single payment network or a combination of multiple payment networks. For example, in various embodiments, the network 160 may include one or more payment rails operated and maintained by one or more financial institutions such as VISA®, MASTERCARD®, STAR®, PULSE®, and/or the like. The payment network 160 may also include secure connections between the merchant POS device 102 the payment processor 114 and one or more payment gateways.

The payment processor 114 may be maintained by, for example, a financial service provider, social networking service, email or messaging service, media sharing service, and/or other service provider, which may provide payment processing services. In yet other embodiments, the payment processor 114 may be maintained by a third-party service provider that is different from the payment provider associated with the payment provider server 134. In certain embodiments, the payment processor may be maintained by the payment provider.

According to one or more particular embodiments, the payment processor 114 includes one or more payment processing applications 116, which may be configured to process payment information received from the merchant POS device 102. For example, the digital wallet application 104 of the merchant POS device 102 may receive first account information corresponding to the user 170 in order to transfer payment to a second account of the merchant. The merchant POS device 102 may transmit the first account information to the payment processing application 116, which may cause payment to be transferred from the first account to the second account based at least in part on the first account information.

Figure 2:
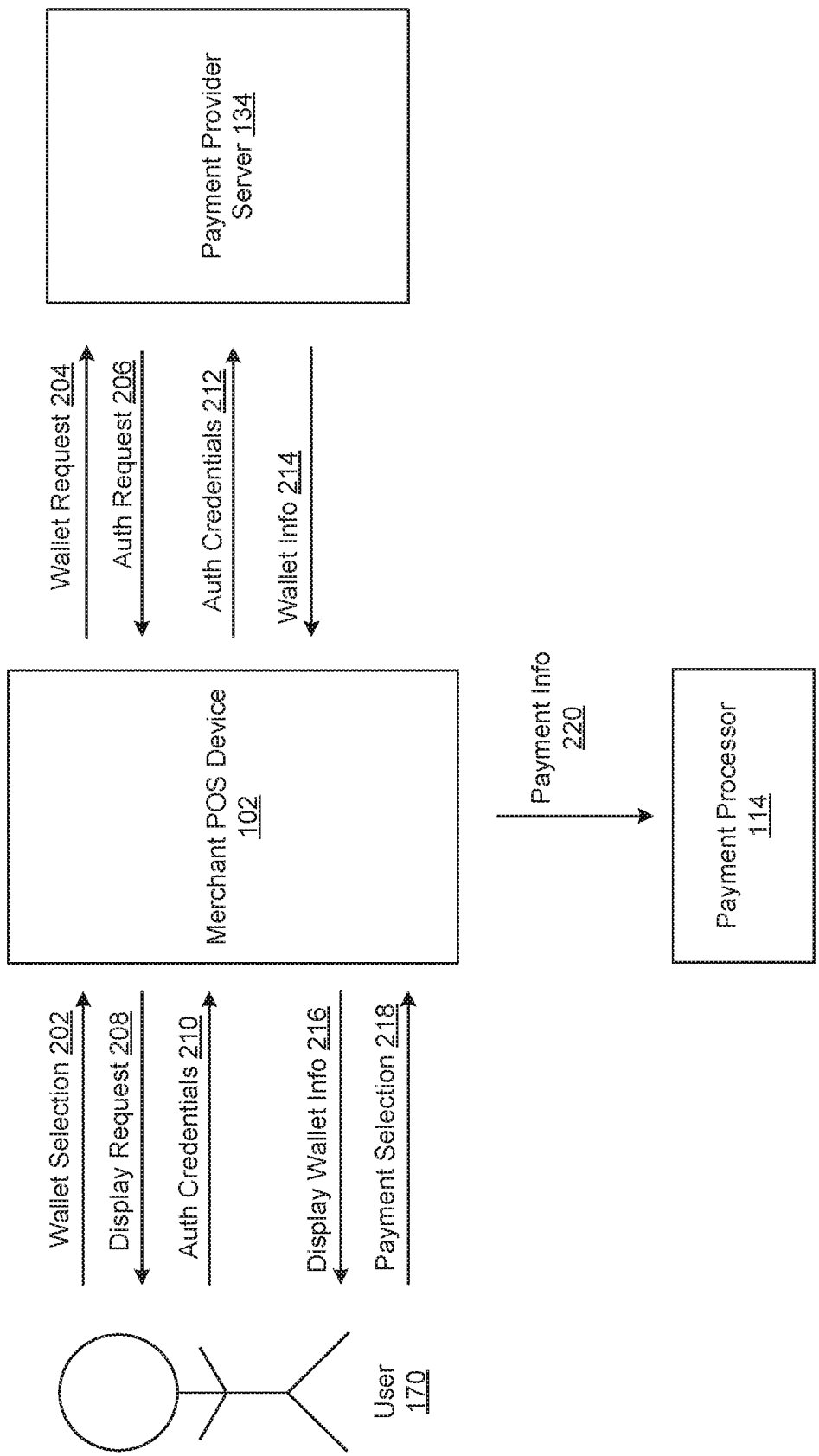
FIG. 2 is an is an example data flow diagram for accessing digital wallet information using a point-of-sale device, according to an embodiment.

Referring now to FIG. 2, a data flow for accessing digital wallet information using a POS device is provided in accordance with a particular embodiment. In certain embodiments, the data flow 200 may be performed by one or more components of the system 100 of FIG. 1, such as the digital wallet application 104, the authentication application 138, the wallet access application 138, and/or a combination thereof. Note that one or more steps, processes, and methods described herein may be omitted, performed in a different sequence, or combined as desired or appropriate.

In certain embodiments, a user may wish to purchase to a product or service offered by the merchant at the merchant location. As such, the user 170 may interact with the merchant POS device 102 to conduct a transaction with the merchant that results in payment by the user 170 for the product or service. At step 202, the user 170 may provide an input, to the merchant POS device 102, that indicates that user wishes to access digital wallet information associated with an account maintained by the payment provider. At step 204, subsequent to receiving the input from the user 170, the merchant POS device 102 may be configured to transmit, to the payment provider server 134, a request to access the account.

At step 206, the payment provider server 134 may transmit an authorization request to the merchant POS device 102 in order to determine whether the user 170 is authorized to access the account. At step 208, subsequent to receiving the authorization request from the payment provider server 134, the merchant POS device 102 may present the authorization request via the display included in the merchant POS device 102.

At step 210, the user 170 may provide authorization credentials to the merchant POS device 102, and at step 212, the merchant POS device 102 may transmit (e.g., forward) the authorization credentials to the payment provider server 134. The payment provider server 134 may authorize the user 170 based on the authorization credentials. At step 214, in response to authorization the user 170, the payment provider server 134 may transmit digital wallet information associated with the account to the merchant POS device 102.

It will be appreciated that in certain embodiments, the input provided by the user 170 at step 202 may include authorization credentials. As such, one or more of steps 204-212 may be omitted, and at step 214, the payment provider server 134 may transmit the digital wallet information to the merchant POS device 102 in response to authenticating the user 170 based on the authentication credentials.

At step 216, the merchant POS device 102 may display the digital wallet information. At step 218, the user 170 may provide a payment selection that indicates a selection of one or more digital payment instruments corresponding to the digital wallet information. At step 220, payment information associated with the one or more digital payment instruments may be transmitted by the merchant POS device 102 to the payment processor 114.

Figure 3:
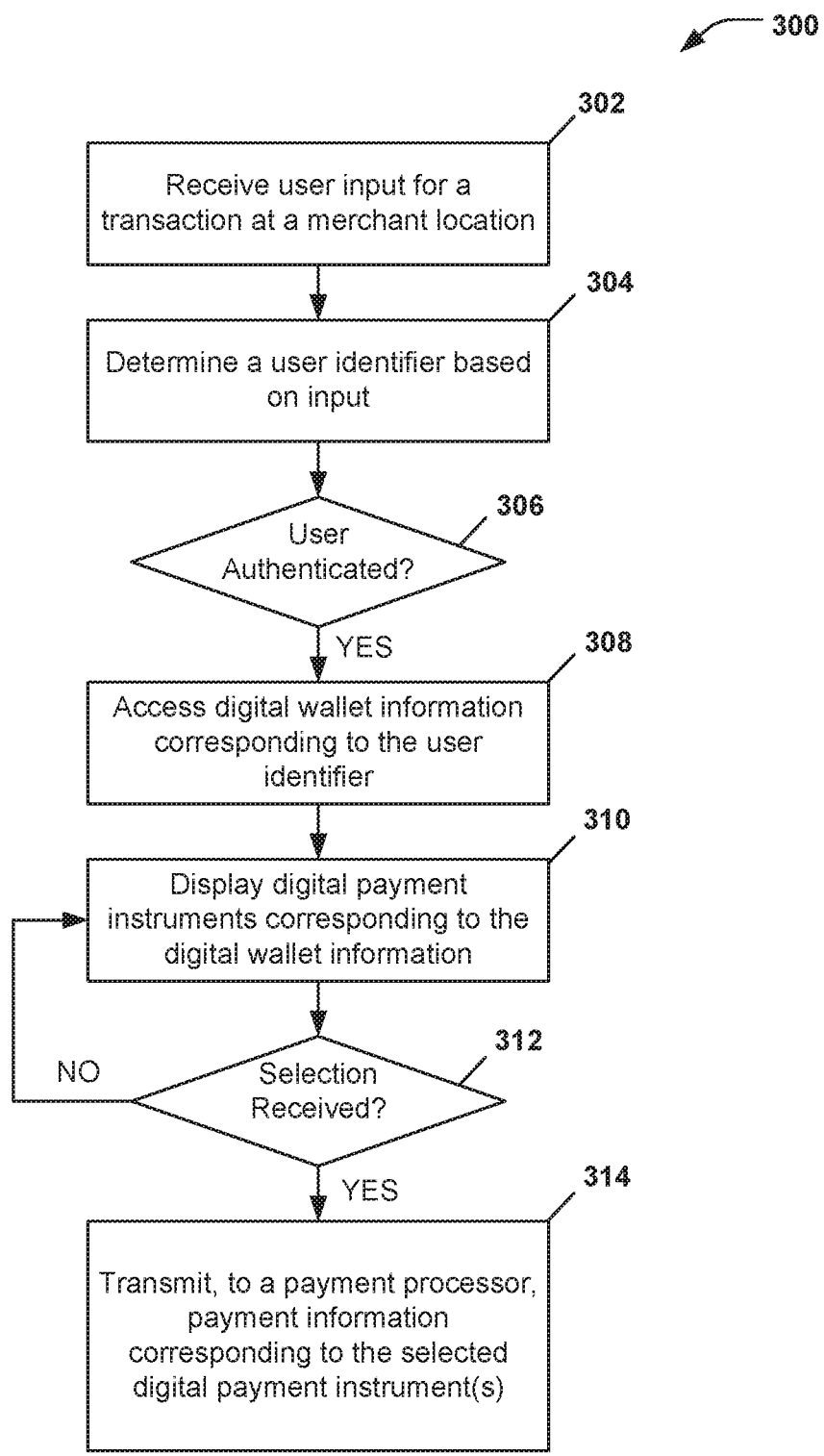
FIG. 3 is an example data flow diagram for accessing digital wallet information using a point-of-sale device, according to another embodiment.

FIG. 3 illustrates a flow diagram of a method 300 for accessing digital wallet information using a POS device. It will be appreciated that while method 300 may be described as being performed by the digital wallet application 104, in other embodiments, the payment provider server 134 (e.g., the authentication application 136 and/or the wallet access application 138) or a combination of the digital wallet application 104 and the payment provider server 134 may perform some or all of the steps of method 300. Note that one or more steps, processes, and methods described herein may be omitted, performed in a different sequence, or combined as desired or appropriate.

At step 302, the digital wallet application 104 of the merchant POS device 102 may receive user input for a transaction at a merchant location, and at step 304, the digital wallet application 104 may determine a user identifier based on the input. For example, in some embodiments, a particular card may be provided by the payment provider to the user 170. The particular card may have a similar or the same form factor as a credit card and/or a debit card. Additionally, the particular card may store a user identifier that is associated with an account that is maintained by the payment provider and that corresponds to the user 170. For instance, the particular card may include a magnetic stripe and/or an integrated circuit (e.g., a chip) that stores the user identifier. Thus, in this example, the input may correspond to the user 170 inserting or swiping the particular card in the merchant POS device 170. As a result of the insertion or swipe, the merchant POS device 102 may be configured to access the data stored on the magnetic stripe and/or the integrated circuit of the particular card, including the user identifier.

According to another particular embodiment, the user 170 may manually input information that corresponds to the user identifier into the merchant POS device 102. For instance, the display of the merchant POS device 102 may be a touch display configured to receive touch inputs. The display may display a virtual keyboard that enables the user 170 to enter information that corresponds to the user identifier, such as username information, password information, email address information, phone number information, other contact information, and/or various other types of information that can be used to identify the user 170. In other embodiments, the merchant POS device 102 may include a physical keypad or keyboard in place of the virtual keyboard presented by the touch display or in addition to the virtual keyboard.

According to another particular embodiment, a particular card, or other relatively small physical object that is not configured to receive input by the user 170, may include a wireless transmitter/transceiver and a storage element that stores the user identifier. In response to the wireless transceiver being located within a predetermined distance from the merchant POS device 102, the wireless transceiver may transmit the user identifier to the merchant POS device 102. For instance, the particular card may include an NFC transmitter that transmits the user identifier when the NFC transmitter comes within range (e.g., the predetermined distance) of the merchant POS device 102.

At step 306, the digital wallet application 104 may determine whether the user 170 is authenticated with the payment provider server 134. For example, the user 170 may enter authentication credentials into the merchant POS device 102. Authentication credentials may include biometric information, username/password information, personal identification numbers (PINs), facial recognition information, voice recognition information, security questions, and/or the like. The merchant POS device 102 may forward the authentication credentials to the payment provider server 134, and the payment provider server 134 may determine whether the authentication credentials are valid. The authentication process of step 306 is described in more detail with respect to FIG. 4.

At step 308, if the authentication credentials are valid and the user 170 is authenticated with the payment provider server 170, the digital wallet application 104 may access digital wallet information (e.g., from the payment provider server 134) based on the user identifier. For instance, a database, such as the database 142 included in the payment provider server 134 and/or another remote database, may store an association between the user identifier and information associated with the account of the user, including the digital wallet information. The digital wallet information may correspond to digital payment instrument(s) associated with the user 170. For instance, the digital wallet information may correspond to information related credit cards, debit cards, coupons, store cards, gift cards, loyalty cards and/or loyalty accounts, bank accounts, electronic checks, merchant offers, and/or any accounts maintained by financial institutions.

At step 310, the merchant POS device 102 may display the digital payment instrument(s) corresponding to the digital wallet information. In some implementations, the merchant POS device 102 may only display a subset of the digital payment instrument(s). In other cases, the merchant POS device 102 may display the digital payment instrument(s) but indicate that one or more of the digital payment instrument(s) are unavailable for use.

For instance, according to a particular embodiment, the digital wallet application 104 may determine that certain digital payment instruments cannot be used as payment options for the merchant and/or merchant location based on certain merchant characteristics. For example, the merchant POS device 102 may be associated with a first merchant identifier that is stored in a database, such as the database 108 included in the merchant POS device 102 and/or another database remote from the merchant POS device 102. Additionally, a particular digital payment instrument of the user 170 may correspond to a gift card that is associated with a second merchant identifier (e.g., the gift card is for a different merchant). The merchant POS device 102 may determine, based on a comparison between the first merchant identifier and the second merchant identifier, that the first merchant identifier is different from the second merchant identifier. Based on this determination, the digital wallet application may determine that the gift card is unavailable for user at the merchant and/or merchant location. As a result, the merchant POS device 102 may not display the gift card as a selectable payment instrument. For example, the merchant POS device 102 may not display the gift card, or the merchant POS device 102 may display the gift card but indicate that the gift card is unavailable for use.

According to another particular embodiment, the merchant POS device 102 may display a recommendation for the user 170 to select a particular digital payment instrument. For example, the particular digital payment instrument may correspond to a loyalty card of the merchant. Further, the digital wallet application may determine that the merchant identifier of the loyalty card is the same as the merchant identifier of the merchant POS device 102. As a result, the digital wallet application 104 may cause the merchant POS device 102 to present, via the display, a recommendation to use the loyalty card for conducting the transaction with the merchant.

At step 312, the digital wallet application 104 may determine whether a selection of any of the digital payment instrument(s) has been received. At step 314, if a selection of one or more of digital payment instrument(s) is received, the digital wallet application 104 may transmit, to the payment processor 114, payment information corresponding to the select one or more digital payment instruments. In certain implementations, the user 170 may select multiple digital payment instruments to complete the transaction.

Figure 4:
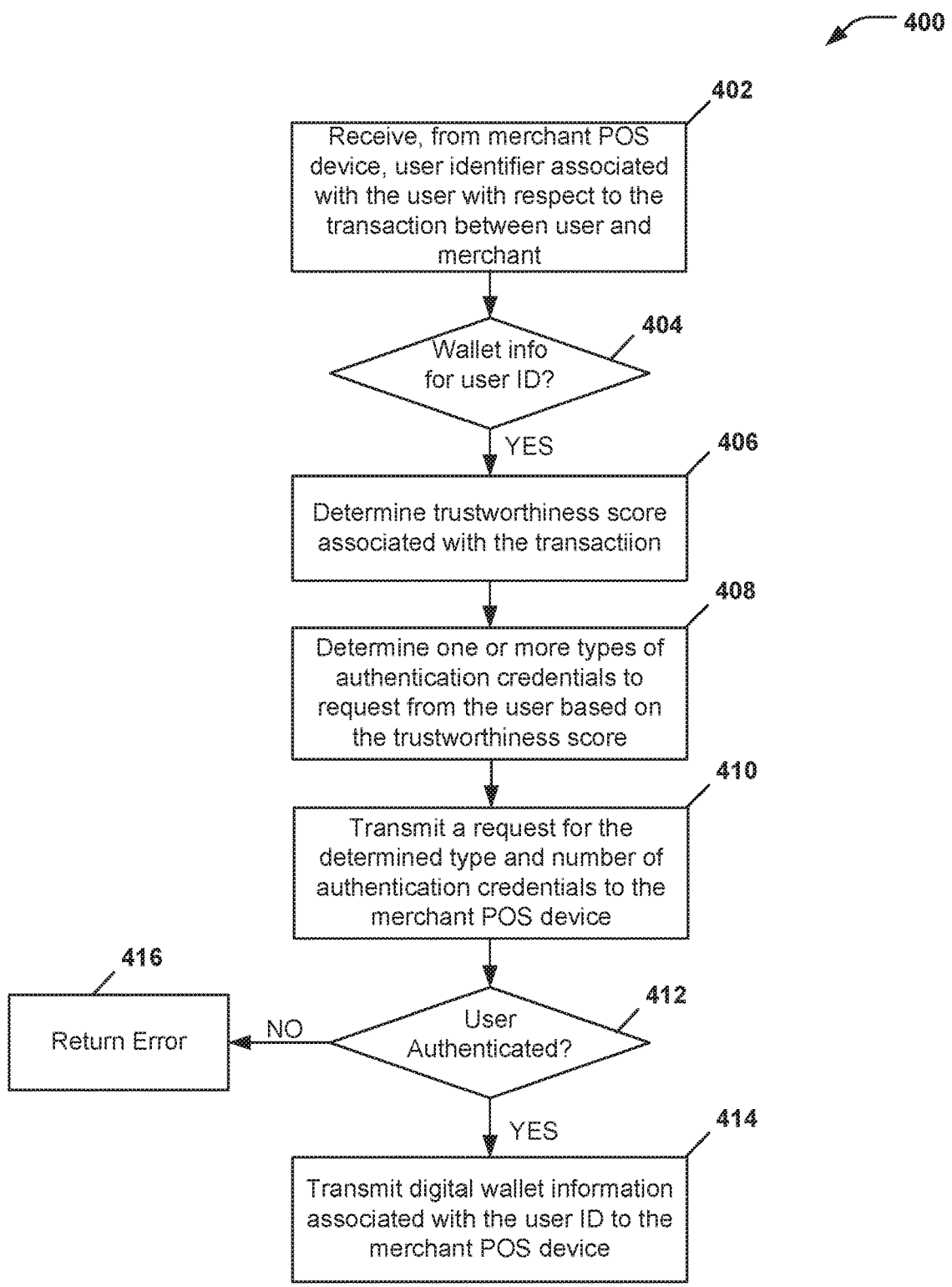
FIG. 4 is an example process flowchart for authenticating a user with a payment provider server, according to an embodiment.

FIG. 4 illustrates a flow diagram of a method 400 for authenticating a user according to step 306 of FIG. 3 in accordance with one or more particular embodiments. It will be appreciated that while method 400 may be described as being performed by the payment provider server 134 (e.g., authentication application 136 and/or the wallet access application 138), in other embodiments, the digital wallet application 104 or a combination of the digital wallet application 104 and the payment provider server 134 may perform some or all of the steps of method 300. Note that one or more steps, processes, and methods described herein may be omitted, performed in a different sequence, or combined as desired or appropriate.

At step 402, the authentication application 136 may receive a user identifier associated with a user, such as user 170. For example, the user identifier may be provided to the merchant POS device 102 by the user 170 as part of performing a transaction between the user and the merchant. As previously discussed, the merchant POS device 102 may subsequently transmit the user identifier to the authentication application 136.

At step 404, the wallet access application 138 may determine whether the user identifier is associated with digital wallet information stored in a database, such as the database 142. If the wallet access application 138 determines that the user identifier is associated with digital wallet information, the method 400 may proceed to step 406.

At step 406, the authentication application 136 may determine a trustworthiness score corresponding to the transaction. The trustworthiness score may be determined based on various factors, including, but not limited to information corresponding to a shopping history of the user 170, a reputation of the merchant or the merchant location, location information corresponding to the user 170, and/or shopping preferences of the user 170. For example, shopping history information associated with the user 170 that indicates the user has frequently shopped with the merchant and/or the merchant location in the past may increase the trustworthiness score. As another example, a higher reputation associated with the merchant and/or merchant location may increase the trustworthiness score while a lower reputation association with the merchant and/or merchant location may decrease the trustworthiness score. In another example, if the authentication application 136 determines that location information associated with the user 170 indicates that the user 170 is located in a different location than the merchant location, the trustworthiness score may be greatly lowered.

At step 408, the authentication application 136 may determine one or more types of authentication credentials to request from the user based on the trustworthiness score. At step 410, the authentication application 136 may transmit a request for the determined one or more type of authentication credentials to the merchant POS device 102. For example, depending on the trustworthiness score, the authentication application 136 may request different types of authentication credentials and different combinations of the different types of authentication credentials from the user 170. The types of authentication credentials may include, but are not limited to, username/password information, biometric information, facial recognition information, voice recognition information, contact information (e.g., phone numbers, emails addresses, etc.), and answers to one or more security questions.

According to particular embodiment, if the authentication application 136 determines that the transaction corresponds to a low trustworthiness score, the authentication application 136 may request, from the user (e.g., transmit the request to the merchant POS device 102), authentication credentials that include username/password information, biometric information, and answers to one or more security questions. According to another particular embodiment, if the authentication application 136 determines that the transaction corresponds to a relatively high trustworthiness score, the authentication application 136 may request (e.g., via the merchant POS device), from the user, authentication credentials that include only a PIN. It will be appreciated that various other combinations of trustworthiness scores, types of authentication credentials, and number of authentication credentials are possible and are contemplated within the present disclosure.

At step 412, the authentication application 136 may determine whether the user 170 is authenticated. For instance, the authentication application 136 may receive, from the merchant POS device 102, authentication credentials in response to the request transmitted in step 410. The authentication application 136 may determine whether the received authentication credentials match stored authentication credentials (e.g., stored in a database, such as database 142) associated with the user identifier of the user 170. If the authentication application 136 determines that the received authentication credentials do not match the stored authentication credentials, the method 400 may proceed to step 416, where the authentication application 136 transmits an error message to the merchant POS device 102. The transmission may cause the merchant POS device 102 to display the error message.

If the authentication application 136 determines that the received authentication credentials match the stored authentication credentials, the method 400 may proceed to step 414. At step 414, wallet access application 138 may access, based on the user identifier, digital wallet information associated an account of the user 170 and transmit the digital wallet information to the merchant POS device 102.

Figure 5:
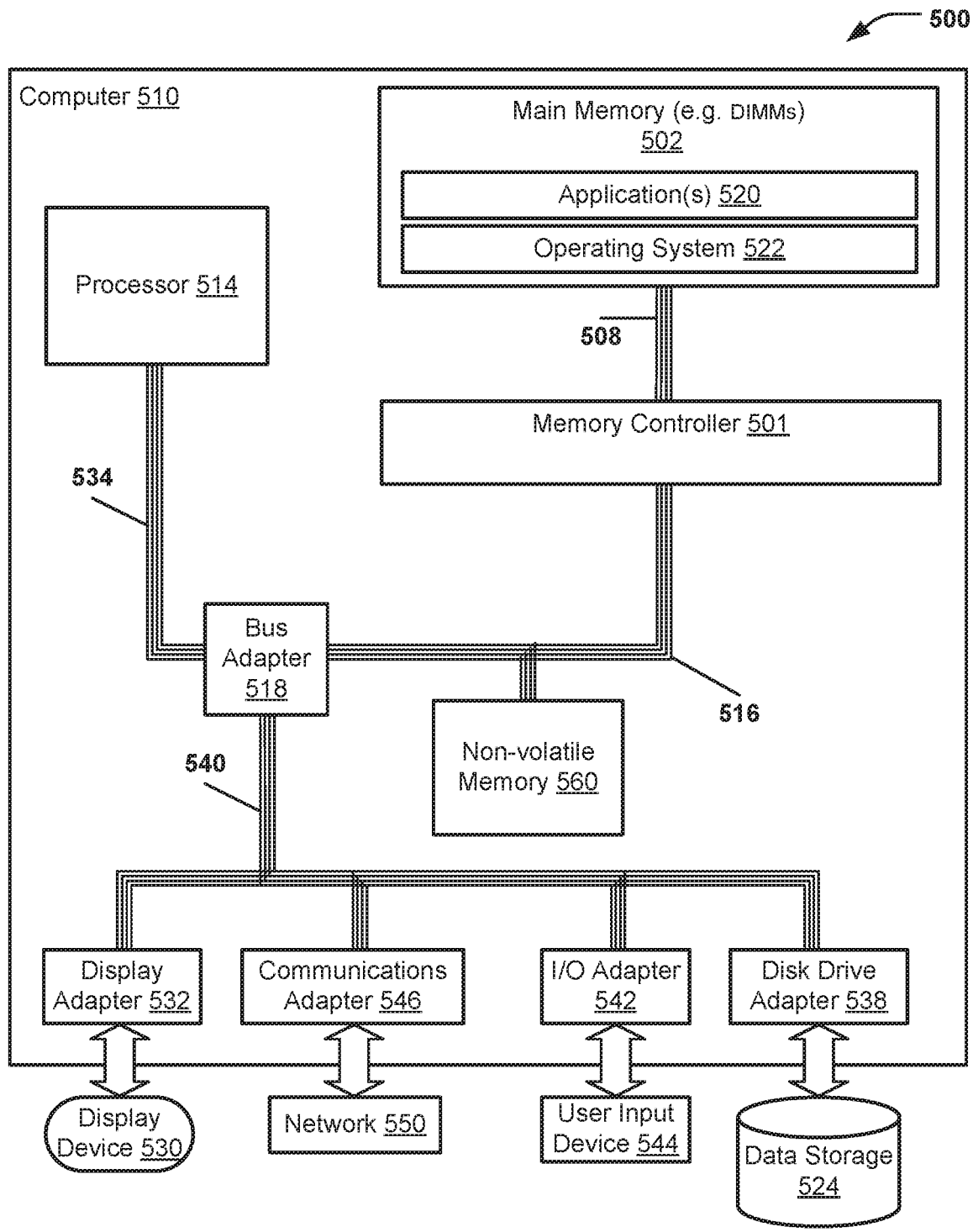
FIG. 5 is a block diagram of a computer system suitable for implementing one or more components in FIG. 1, and/or FIG. 2, according to an embodiment.

FIG. 5 is a block diagram of a computer system 500 suitable for implementing one or more components in FIG. 1, according to an embodiment. Referring to FIG. 5, an illustrative system 500 including a computer 510 is shown. The computer 510 may be an implementation of a computing system that includes or corresponds to the merchant POS device 102, the payment processor 114, and/or payment provider server 134 of FIG. 1. The computer 510 includes at least one computer processor (CPU) 514 (e.g., a hardware processor) as well as main memory 502, a memory controller 501, and a non-volatile memory 560. The main memory 502 is connected through a memory bus 508 to the memory controller 501. The memory controller 501 and the non-volatile memory 560 are connected through a second memory bus 516 and a bus adapter 518 to the processor 514 through a processor bus 534.

Stored at the memory 502 are one or more applications 520 that may be module(s) or computer program instructions for carrying out particular tasks (e.g., the digital wallet application 104, web browsers, authentication application 136, wallet access application 138, and payment processing applications 116 of FIG. 1). Also stored at the main memory 502 is an operating system 522. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 522 and the application 520 in the example of FIG. 5 are shown in the main memory 502, but components of the aforementioned software may also, or in addition, be stored at non-volatile memory (e.g., on data storage, such as data storage 524 and/or the non-volatile memory 560).

The computer 510 includes a disk drive adapter 538 coupled through an expansion bus 540 and the bus adapter 518 to the processor 514 and other components of the computer 510. The disk drive adapter 538 connects non-volatile data storage to the computer 510 in the form of the data storage 524 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 524 may store the data and information described herein.

The computer 510 also includes one or more input/output ("I/O") adapters 542 that implement user-oriented input/output through, for example, software drivers and computer hardware for controlling input and output to and from user input devices 544, such as keyboards and mice. In addition, the computer 510 includes a communications adapter 546 for data communications with a data communications network 560. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 546 implements the hardware level of data communications through which one computer sends data communications to another computer, directly or through a data communications network. Examples of the communications adapter 546 suitable to use in the computer 510 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 510 also includes a display adapter 532 that facilitates data communication between the bus adapter 518 and a display device 530, enabling the application 520 to visually present output on the display device 530.

In various embodiments of the present disclosure, execution of instruction sequences to practice the present disclosure may be performed by computer system 500. In various other embodiments of the present disclosure, a plurality of computer systems 500 coupled by communications adapter 546 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A merchant point-of-sale (POS) device associated with a merchant location, the merchant POS device comprising:
a display;
a memory storing computer-executable instructions; and
one or more hardware processors configured to execute the computer-executable instructions to cause the merchant POS device to perform operations comprising:
receiving an input corresponding to a transaction at the merchant POS device associated with the merchant location;
determining, based on the input, an identifier corresponding to a user;
determining a trustworthiness score associated with the transaction based on information selected from a group consisting of shopping history information associated with the user, reputation information associated with a merchant corresponding to the merchant location, reputation information associated with the merchant location, location information corresponding to the user, and shopping preference information corresponding to the user;
determining based on the location information corresponding to the user, that the user is not within a predetermined distance from the merchant location;
in response to the determining that the user is not within the predetermined distance from the merchant location, lowering the trustworthiness score associated with the transaction;
determining that the trustworthiness score is below a predetermined threshold, wherein the trustworthiness score below the predetermined threshold requires a voice authentication for an execution of the transaction;
in response to the trustworthiness score being below the predetermined threshold, requesting, by the merchant POS device, a voice recognition sample from the user;
receiving, via the merchant POS device, the voice recognition sample from the user;
authenticating, via an electronic network, the user with a payment provider server of a payment provider based on the voice recognition sample matching voice recognition data associated with the identifier;
accessing, via the electronic network, from the payment provider server based on the identifier, digital wallet instruments corresponding to a digital wallet account of the user that is maintained by the payment provider;
for each of the digital wallet instruments, determining a corresponding merchant identifier;
comparing each of the determined merchant identifiers to a merchant identifier corresponding to the merchant POS device;
determining a state for each of the digital wallet instruments as either available or unavailable based on the comparing each of the determined merchant identifiers to the merchant identifier corresponding to the merchant POS device;
presenting, via the display, (i) one or more of the digital wallet instruments having a state of available, and (ii) one or more of the digital wallet instruments having a state of unavailable with an indication of the state of unavailable;
receiving a selection of a first digital wallet instrument of the one or more of the digital wallet instruments having the state of available; and transmitting, via a payment network to a payment processor, payment instructions that cause the payment processor to process a payment corresponding to the transaction using first payment information associated with the first digital wallet instrument.

2. The merchant POS device of claim 1, wherein the operations further comprise:
receiving a second selection of a second digital wallet instrument of the one or more digital wallet instruments, wherein the payment instructions cause the payment processor to process the payment using the first payment information and second payment information associated with the second digital wallet instrument.

3. The merchant POS device of claim 2, wherein the first digital wallet instrument corresponds to a credit card, and the second digital wallet instrument corresponds to a coupon.

4. The merchant POS device of claim 1, wherein the first payment information comprises information selected from a group consisting of credit card information, coupon information, loyalty card information associated with the merchant, bank account information, gift card information, and electronic check information.

5. The merchant POS device of claim 1, wherein the operations further comprise:
transmitting the voice recognition sample to the payment provider server subsequent to the receiving the voice recognition sample from the user.

6. The merchant POS device of claim 1, wherein the input comprises a username and password.

7. The merchant POS device of claim 1, wherein the display comprises a touch display, and wherein the input is received via the touch display.

8. A method, comprising:
receiving, by a merchant point-of-sale (POS) device associated with a merchant and a merchant location, an input corresponding to a transaction at the merchant location;
determining, by the merchant POS device based on the input, an identifier corresponding to a user;
determining a trustworthiness score associated with the transaction based on information selected from a group consisting of shopping history information associated with the user, reputation information associated with the merchant, reputation information associated with the merchant location, location information corresponding to the user, and shopping preference information corresponding to the user;
determining, based on the location information corresponding to the user, that the user is not within a predetermined distance from the merchant location;
in response to the determining that the user is not within the predetermined distance from the merchant location, lowering the trustworthiness score associated with the transaction;
determining that the trustworthiness score is below a predetermined threshold, wherein the trustworthiness score below the predetermined threshold requires a voice authentication for an execution of the transaction;
in response to the trustworthiness score being below the predetermined threshold, requesting, by the merchant POS device, a voice recognition sample from the user;
receiving, by the merchant POS device, the voice recognition sample from the user;
authenticating, by the merchant POS device via an electronic network, the user with a payment provider server of a payment provider based on the voice recognition sample matching voice recognition data associated with the identifier;
accessing, by the merchant POS device via the electronic network, from the payment provider server based on the identifier, digital wallet instruments corresponding to a digital wallet account of the user that is maintained by the payment provider;
for each of the digital wallet instruments, determining a corresponding merchant identifier;
comparing each of the determined merchant identifiers to a merchant identifier corresponding to the merchant POS device;
determining a state for each of the digital wallet instruments as either available or unavailable based on the comparing;
presenting, via a display of the merchant POS device, (i) one or more digital wallet instruments having a state of available, and (ii) one or more of the digital payment wallet instruments having a state of unavailable with an indication of the state of unavailable;
receiving, by the merchant POS device, a selection of a first digital wallet instrument of the one or more digital wallet instruments having the state of available; and
transmitting, by the merchant POS device via a payment network to a payment processor, payment instructions that cause the payment processor to process a payment corresponding to the transaction using first payment information associated with the first digital wallet instrument.

9. The method of claim 8, further comprising:
receiving, by the merchant POS device, a second selection of a second digital wallet instrument of the one or more digital wallet instruments, wherein the payment instructions cause the payment processor to process the payment using the first payment information and second payment information associated with the second digital wallet instrument.

10. The method of claim 8, wherein the first payment information comprises information selected from a group consisting of credit card information, coupon information, loyalty card information associated with the merchant, bank account information, gift card information, and electronic check information.

11. The method of claim 8, further comprising:
transmitting the voice recognition sample to the payment provider server subsequent to the receiving the voice recognition sample from the user.

12. The method of claim 8, wherein the input comprises a personal identification number (PIN).

13. The method of claim 8, wherein input corresponding to the transaction at the merchant location is received via a virtual keyboard of the merchant POS device.

14. A non-transitory computer-readable medium storing computer-executable instructions, that in response to execution by one or more hardware processors, causes a merchant point-of-sale (POS) device to perform operations comprising:
receiving, by the merchant POS device, an input corresponding to a transaction at a merchant location, wherein the merchant POS device is associated with the merchant location;
determining, based on the input, an identifier corresponding to a user account of a user;
determining a trustworthiness score associated with the transaction based on information selected from a group consisting of shopping history information associated with the user account, reputation information associated with a merchant corresponding to the merchant location, reputation information associated with the merchant location, location information corresponding to the user, and shopping preference information corresponding to the user account;

determining, based on the location information corresponding to the user, that the user is not within a predetermined distance from the merchant location;

in response to the determining that the user is not within the predetermined distance from the merchant location, lowering the trustworthiness score associated with the transaction;

determining that the trustworthiness score is below a predetermined threshold, wherein the trustworthiness score below the predetermined threshold requires a voice authentication for an execution of the transaction;

in response to the trustworthiness score being below the predetermined threshold, requesting, by the merchant POS device, a voice recognition sample from the user;

receiving, via the merchant POS device, the voice recognition sample from the user;

authenticating, via an electronic network, the user account with a payment provider server of a payment provider based on the voice recognition sample matching voice recognition data associated with the identifier;

accessing, via the electronic network, from the payment provider server based on the identifier, digital wallet instruments corresponding to the user account maintained by the payment provider;

for each of the digital wallet instruments, determining a corresponding merchant identifier;

comparing each of the determined merchant identifiers to a merchant identifier corresponding to the merchant POS device;

determining a state for each of the digital wallet instruments as either available or unavailable based on the comparing;

presenting, via a display of the merchant POS device, (i) one or more digital wallet instruments having a state of available, and (ii) one or more of the digital wallet instruments having a state of unavailable with an indication of the state of unavailable;

receiving a selection of a first digital wallet instrument of the one or more digital wallet instruments having the state of available; and transmitting, via a payment network to a payment processor, payment instructions that cause the payment processor to process a payment corresponding to the transaction using first payment information associated with the first digital wallet instrument.

15. The computer-readable medium of claim 14, wherein the operations further comprise:

receiving a second selection of a second digital wallet instrument of the one or more digital wallet instruments, wherein the payment instructions cause the payment processor to process the payment using the first payment information and second payment information associated with the second digital wallet instrument.

16. The computer-readable medium of claim 14, wherein the first payment information comprises information selected from a group consisting of credit card information, coupon information, loyalty card information associated with the merchant, bank account information, gift card information, and electronic check information.

17. The computer-readable medium of claim 14, wherein the operations further comprise:

transmitting the voice recognition sample to the payment provider server subsequent to the receiving the voice recognition sample.

18. The computer-readable medium of claim 14, wherein the operations further comprise displaying an indication of the first digital wallet instrument as recommended for the transaction.

19. The computer-readable medium of claim 14, wherein the input is wireless received from a user device of the user.

20. The computer-readable medium o claim 14, wherein the input comprises a personal identification number (PIN).

* * * * *